(12) United States Patent
Patil

(10) Patent No.: US 11,018,744 B2
(45) Date of Patent: May 25, 2021

(54) BLOCK-DIAGONALIZATION BASED BEAMFORMING

(71) Applicant: Telefonaktiebolaget LM Ericsson (publ), Stockholm (SE)

(72) Inventor: Darshan Arvind Patil, Stockholm (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 0 days.

(21) Appl. No.: 16/635,453

(22) PCT Filed: May 29, 2018

(86) PCT No.: PCT/SE2018/050536
§ 371 (c)(1),
(2) Date: Jan. 30, 2020

(87) PCT Pub. No.: WO2019/027363
PCT Pub. Date: Feb. 7, 2019

(65) Prior Publication Data
US 2020/0373981 A1      Nov. 26, 2020

Related U.S. Application Data

(60) Provisional application No. 62/539,137, filed on Jul. 31, 2017.

(51) Int. Cl.
*H04B 7/06* (2006.01)
*H04B 7/0426* (2017.01)
*H04B 7/0452* (2017.01)

(52) U.S. Cl.
CPC .......... *H04B 7/0617* (2013.01); *H04B 7/043* (2013.01); *H04B 7/0452* (2013.01); *H04B 7/0634* (2013.01)

(58) Field of Classification Search
CPC .... H04B 7/0617; H04B 7/043; H04B 7/0634; H04B 7/0452
See application file for complete search history.

(56) References Cited

U.S. PATENT DOCUMENTS

| 2009/0046009 A1* | 2/2009 | Fujii | H04B 7/0417 342/373 |
| 2010/0238797 A1* | 9/2010 | Guo | H04L 5/0098 370/225 |
| 2012/0289266 A1* | 11/2012 | Park | H04B 7/0617 455/501 |

(Continued)

OTHER PUBLICATIONS

International Search Report and Written Opinion dated Aug. 9, 2018 issued in International application No. PCT/SE2018/050536. (9 pages).

(Continued)

*Primary Examiner* — Jean B Corrielus
(74) *Attorney, Agent, or Firm* — Rothwell, Figg, Ernst & Manbeck, P.C.

(57) ABSTRACT

Embodiments provide an innovative solution for finding the beamforming vectors which are based on classical BD. Particularly, embodiments exploit the principle of coherence interval, which suggests that the amplitude and phase of the channel is relatively constant over a small interval on a given t-f resource and thus, there is no need to re-compute the beamforming weights again. Instead, the previously computed weights (on the small interval of the given t-f resource) can be updated. To do this less-computationally-intense update operation, embodiments further exploit a principle from perturbation theory; namely, that when there is a minor change in the entries of a matrix, the decomposition of the matrix and the rank does not change heavily. In embodiments, the need to re-compute the BF weights can therefore be avoided.

13 Claims, 14 Drawing Sheets

(56) References Cited

U.S. PATENT DOCUMENTS

2017/0288307 A1* 10/2017 Hu .................. H04B 7/10
2020/0021338 A1* 1/2020 Perlman ............... H04B 7/0434

OTHER PUBLICATIONS

Yu, Heejung et al., "Beam Tracking for Interference Alignment in Slowly Fading MIMO Interference Channels: A Perturbations Approach Under a Linear Framework", IEEE Transactions on Signal Processing, vol. 60., No. 4 (Apr. 2012). (18 pages).
Manolakos, Alexandros et al., "Inteference due to Null Space Mismatch in Cooperative Multipoint MIMO Cellular Networks", IEEE ICC 2014—Wireless Communications Symposium. (6 pages).
Tse, David, and Pramod Viswanath. Fundamentals of wireless communication. Cambridge university press, 2005. 646 pages.
Ni, Weiheng, and Xiaodai Dong. "Hybrid block diagonalization for massive multiuser MIMO systems." IEEE transactions on communications 64.1 (2016): 201-211.
Costa, Max. "Writing on dirty paper (corresp.)." IEEE transactions on information theory 29.3 (1983): 439-441.
Caire, Giuseppe, and Shlomo Shamai. "On the achievable throughput of a multiantenna Gaussian broadcast channel." IEEE Transactions on Information Theory 49.7 (2003): 1691-1706.
Spencer, Quentin H., A. Lee Swindlehurst, and Martin Haardt. "Zero-forcing methods for downlink spatial multiplexing in multiuser MIMO channels." IEEE Transactions on Signal Processing 52.2 (2004): 461-471.
Tran, Le-Nam, Mats Bengtsson, and Björn Ottersten. "Iterative precoder design and user scheduling for block-diagonalized systems." IEEE transactions on signal processing 60.7 (2012): 3726-3739.
Stewart, Gilbert W. "Stochastic perturbation theory." (1990). (33 pages).
Li, Tien-Yien, and Zhonggang Zeng. "A rank-revealing method with updating, downdating, and applications." SIAM Journal on Matrix Analysis and Applications 26.4 (2005): 918-946.

* cited by examiner

BLOCK-DIAGONALIZATION BASED BEAMFORMING

CROSS REFERENCE TO RELATED APPLICATION(S)

This application is a 35 U.S.C. § 371 National Stage of International Patent Application No. PCT/SE2018/050536, filed May 29, 2018, designating the United States and claiming priority to U.S. provisional application no. 62/539137, filed on Jul. 31, 2017. The above identified applications are incorporated by reference.

TECHNICAL FIELD

Disclosed are embodiments related to improved block-diagonalization based beamforming.

BACKGROUND

With the advent of 5G in the telecommunication industry, the need for devices capable of processing high data rates, and doing so with low complexity, is inevitable. Although this generation of communication technology will be more focused on connecting things (e.g., as in the Internet of Things (IoT)), it is also expected to improve existing Mobile Broadband (MBB) services. Technologies like Multiple Input Multiple Output (MIMO) and Orthogonal Frequency-Division Multiplexing (OFDM), which were introduced in Long Term Evolution (LTE) and advanced 4G solutions, will play a fundamental role in 5G technologies. According to recent trends in data consumption by consumers, video and music streaming on smart-phones has shown tremendous growth over the past few years. Furthermore, more users are engaged in both mobility as well as data consumption, which emphasizes the need to evolve the existing telecommunication infrastructure to accommodate this type of usage pattern.

Factors in the radio interface such as noise, propagation environment, and interference, severely limits the communication capacity and reliability of devices. To obtain an effective communication system, radio engineers need to carefully design algorithms which can cancel the effects of such factors. This could be performed at various levels, such as at an analog radio-frequency (RF) level or through digital signal processing (DSP) (or both). It is not uncommon to use good filtering mechanisms in order to curtail the noise effects. Signal-to-noise ratio (SNR) shows the impact of noise on transmitted data signal. On the other hand, signal-to-interference-and-noise ratio (SINR) shows the impact of both noise as well as interference on the transmitted signal. In a non-stationary wireless environment where transmitters and receivers are relatively mobile, the propagation environment is crucial to the design of communication systems, as the propagation environment can drastically impair reception. Finally, modeling a multi-user communication system has recently become extremely important, especially in wideband systems, as the need to effectively utilize the spectrum resources is vital to an inclusive communication environment.

Apart from these challenges, the power required to transmit data is a point of concern. Therefore, techniques which help reduce the transmission power have significant importance. Ideally, a designer of a communications system would want to fix all the above impairments and concerns. In reality, though, a solution will often involve trade-offs, where improvements in one area (e.g., interference) lead to increased problems in another area (e.g., capacity). Additionally, fixing these problems might involve the use of complex algorithms (for example, using digital processing or a high usage of expensive analog radio devices), which presents another trade-off problem.

In point-to-point (P2P) communication systems, a multi-path fading environment is regarded as a limitation. The performance of the channel becomes extremely poor when the channel is in a deep fade as compared to a reference channel such as an Additive White Gaussian Noise (AWGN) channel. Diversity techniques mitigate these limitations by exploiting such a phenomenon, where a same information is sent across possibly independent faded paths, so that the probability of successful transmission increases. Thus, the reliability of data transmission (where diversity techniques are used) is increased; and the gain is proportional to the number of independent paths, which also corresponds to the diversity order of the system. Some of the diversity techniques include time diversity, where interleaving of coded symbols over time is performed; frequency diversity; inter-system equalization; multi-path combining in spread-spectrum systems; coding over sub-carriers in OFDM systems; and spatial diversity, using space-time coding in multiple transmit and/or receive antennas.

Another way of exploiting the multi-path components is to send different information over them, to effectively increase the amount of the transmitted information. This concept is known as multiplexing. The gain achieved through such a process is known as multiplexing gain and is proportional to the number of independent paths available at a given time instance. Extending the principle followed in spatial diversity to the multiplexing scenario, a technique known as spatial multiplexing (SM) was introduced. This technique is one of the foundations on which multi-antenna technologies like MIMO are based. In MIMO, the transmit and receive antenna arrays are arranged in a way such that several independent streams of information can simultaneously be communicated. However, the performance depends heavily on the richness of the scattering environment, which allows the receive antennas to separate out the signals from the different transmit antennas. In this way, the multiple antennas effectively increase the number of degrees of freedom in the system to allow spatial separation and multiplexing. Therefore, spatial diversity in MIMO leads to reliability; whereas spatial multiplexing leads to increased capacity/data rate, and thus improved efficiency of the spectrum usage than in other frequency multiplexing techniques.

Other techniques, like interference cancellation, can also be adopted in order to maximize capacity. All the above techniques are harmonious, and the choice of the technique or combination of them depends on the specific requirements and other background factors. In a wireless access network, the base-station (BS) (e.g., eNodeB in 4G, gNB in 5G) can serve different geographically located user equipments (UEs) without separate time-frequency resources by using space division multiple access (SDMA). This phenomenon can be seen as a natural extension of SM for a multi-user MIMO (MU-MIMO) environment. In this case, the spectral efficiency can be related to the excess degrees of freedom harnessed at the BS in order to serve the multitude of users under normal channel conditions.

For a single-user MIMO (SU-MIMO) model, traditional receiver solutions like Zero-Forcing (ZF), Minimum Mean Squared Error (MMSE), and Successive Interference Cancellation (SIC), are known. ZF solutions approximately invert the channel at the receiver to estimate the transmitted data. This least square solution, however, results in noise amplification which can be a major disadvantage. MMSE-based solutions employ a Bayesian approach where linear solutions are evaluated by minimizing the mean error in between transmitted data and received estimates. SIC solutions can further enhance performance by successively canceling streams as they are decoded, and can achieve the capacity of a fast fading MIMO channel. However, computational complexity increases in SIC solutions, which limits the use of such solutions in large-scale systems.

Another way to model and evaluate capability of MIMO systems is through singular value decomposition (SVD). Aligning the transmit signal in the direction of a transmit antenna array is called transmit (TX) beamforming (BF) or precoding. At the receiver side, if the received signal is projected in the direction of a receive antenna array, then it is called receiver (RX) beamforming (BF). SVD can help to quantify the number of spatial dimensions for a given channel. The complex channel gain is assumed to be known to both the transmitter (e.g., via Channel State Information (CSI) feedback from the receiver) and the receiver. This matrix consists of channel gains corresponding to pair-wise transmitter and receiver antennas sampled from the array at both the transmitter and receiver sides. SVD is a mathematical step in matrix computations to decompose the Gaussian vector channel into a set of parallel, independent scalar sub-channels. This degree-of-freedom can be quantified by a minimum number of transmit or receive antennas, which is also called the spatial dimensions of the MIMO channel. Further, the channel is decoupled using transmit and receive beamforming; and the maximum capacity of the system can be computed by simple addition of the capacities from individual sub-channel links.

Usually, one of the requirements for an algorithm designer is to provide a solution which would consume less power. In order to maximize the capacity of a decoupled MIMO system under a given power constraint, power can be allocated to only good sub-channels. This can be achieved by waterfilling power allocation techniques. Beamforming (BF) techniques (e.g., the generation of modulation weights and a function of amplitude and phase for different antenna paths) could be performed in different ways, such as baseband BF (precoding and combining is performed in the baseband), RF-BF (precoding and combining is performed in RF), and Hybrid-BF (precoding and combining is performed at both baseband and RF).

FIG. 1 illustrates an example of MU-MIMO system 100. The BS 102 (e.g., an Access Point (AP) node) transmits multiple independent data streams (e.g., via beams 110, 112, 114, 116) to multiple UEs (e.g., UE 104, UE 106, UE 108) over the same set of time-frequency resources (e.g., resource elements) by relying on CSI to exploit the spatial domain. Each of BS 102 and UEs 104-108 comprise one or more transmit and/or receive antennas and/or antenna arrays.

Massive MIMO, also referred to as very large MIMO (VL-MIMO) or full dimension MIMO (FD-MIMO) will be a key technique for 5G systems. Massive MIMO relies on having (and accessing from the baseband) a very large number of BS antennas (possibly in the order of hundreds) for improving the spatial resolution (and the link budget at millimeter-wave frequencies). This enables the BS to design simple (linear) BF techniques both for uplink and downlink to heavily mitigate inter-user interference. This, in turn, makes it possible to serve several (possibly in the order of tens) UEs on overlapping time-frequency resources with UE-specific beams, provided the BS has good-enough channel estimates to design the UE-specific beams.

A technique known as "Dirty Paper Coding" (DPC) by Costa has gained much attention since use of it in precoding has proven to be optimally capacity-achieving. However, the unconventional coding gives rise to increased complexity at both the transmitter and receiver. Another known algorithm (based on ZF techniques) cancels the inter-user interference iteratively, but again at a high computational cost.

Existing linear solutions such as Channel Inversion and Zero Forcing are more suitable for MIMO systems where a UE has a single antenna. If the receiver has multiple antennas, complete diagonalization of the channel at the transmitter is suboptimal at all SNRs, since each user can coordinate the processing of its own receiver outputs. Additionally, when the channel in between the BS and users is highly spatially correlated, the sum rate capacity of the system deteriorates.

Alternatively, non-iterative BF algorithms have been proposed which are based on block-diagonalization (BD). Although sub-optimal at low SNRs, it is computationally efficient and convenient to implement. Even though this algorithm nearly achieves the sum throughput goal for optimal user sets at high SNRs asymptotically, the computation of SVD and the waterfilling process (required by these techniques) requires substantial computation.

Recently, another approach to BD-based algorithms was proposed, which uses QR decomposition. This approach is a low-complexity BD algorithm for sum rate maximization, having the same performance as the original BD scheme but with reduced complexity.

SUMMARY

Although recent advances have improved BD-based algorithms, further improvements are needed.

The increasing demand of high data rates by users in a mobile environment suggests a need for improved communication systems. In designing these systems, however, often one must also consider the computational resources like memory, power, and the complexity needed to implement solutions with high performance. Thus, a trade-off is required. The advantage of MIMO systems (e.g., using SM techniques) in terms of capacity is substantially high. To implement such a scheme in a multi-user scenario would be advantageous. In the uplink direction (e.g., reverse link, from UE to BS), this system essentially becomes a conventional MIMO system, as the BS deals with each user individually. In the downlink direction (e.g., forward link, from BS to UE), however, a more sophisticated approach must be considered, since the BS has to account for the interference from un-intended users.

As discussed above, both classic BD algorithms and more recent QR-based BD algorithms aim to achieve low-complexity sum rate capacity maximization. Known approaches (including channel inversion and BD-based algorithms), however, suffer from various shortcomings such as either having too high of a complexity or too low of a sum rate capacity (or both). Embodiments disclosed herein aim to further design a BD-based algorithm for BF, which would be more suitable for massive MIMO applications with high sum rate performance, but with much lower complexity than that required for existing BD algorithms (whether classical or QR-based).

Embodiments have all the advantages of the classical BD technique, such as higher system sum rate capacities for highly correlated channels (e.g., as compared to traditional linear TX BF solutions like channel inversion). Additionally, embodiments are much simpler and utilize at least an order of a magnitude less floating point operations (FLOPS) than the existing BD solutions, particularly when the antenna array size of transmitter is very large. Embodiments provide a solution that is extremely convenient and robust as it adapts easily to the scenarios where there is a minor change in the rank of the channel estimates. For multipath channel environments where the channel estimates do not vary much, embodiments greatly save system resources, while achieving desirable performance (e.g., sum rate capacity, processing complexity). For massive MIMO and IoT applications, and systems with a large number of users, embodiments perform much better than traditional TX BF solutions.

Embodiments emphasize techniques that allow multi-user systems to cope with rapidly increasing demand for network densification. Embodiments also emphasize techniques that allow for solving the optimization problem of maximizing the rate of the data transmitted, subject to a given power constraint.

Embodiments are more robust to spatial correlations and some embodiments consider rank adaptation for multiple antennas at the receivers, which can lead to throughput maximization of the system.

According to a first aspect, a method for Multi-User (MU) Multiple Input Multiple Output (MIMO) transmit beamforming performed by a base station (BS) serving a first set of users is provided. The first set of users includes a first user. The method includes obtaining, by the BS, channel estimates of the first set of users for a plurality of subcarriers, the plurality of subcarriers including a first subcarrier and a second subcarrier. The method further includes computing, by the BS, beamforming weights for the first user. Computing, by the BS, the beamforming weights for the first user includes (1) determining a second set of users, the second set of users being a subset of the first set of users and not including the first user; (2) determining a first matrix decomposition of a first matrix, the first matrix being based on the channel estimates of the second set of users for the first subcarrier, and wherein determining the first matrix decomposition of the first matrix comprises using a matrix decomposition algorithm; (3) computing a first set of beamforming weights for the first subcarrier based on the first matrix decomposition and the channel estimates of the first user for the first subcarrier; (4) updating the first matrix decomposition based on the channel estimates of the second set of users for the second subcarrier; and (5) computing a second set of beamforming weights for the second subcarrier based on the first matrix decomposition and channel estimates of the first user for the second subcarrier. The method further includes the BS transmitting data to the first user. Transmitting the data comprises transmitting the data using at least one of the first set and the second set of beamforming weights for the first user.

In some embodiments, the plurality of subcarriers further includes a third subcarrier, and computing, by the BS, the beamforming weights for the first user further includes: (6) determining whether a condition is true. Determining whether the condition is true comprises determining whether a difference (e.g., Euclidean distance) between the channel estimates of the first set of users for the first subcarrier and the channel estimates of the first set of users for the third subcarrier exceeds a perturbation threshold. In embodiments, (7a) as a result of determining that the condition is true, computing, by the BS, the beamforming weights for the first user further includes (7a-i) determining a second matrix decomposition of a second matrix, the second matrix being based on the channel estimates of the second set of users for the third subcarrier, and wherein determining the second matrix decomposition of the second matrix comprises using the matrix decomposition algorithm; and (7a-ii) computing a third set of beamforming weights for the third subcarrier based on the second matrix decomposition and the channel estimates of the first user for the third subcarrier.

In some embodiments, (7b) as a result of determining that the condition is false, computing, by the BS, the beamforming weights for the first user further includes (7b-i) updating the first matrix decomposition based on the channel estimates of the second set of users for the third subcarrier; and (7b-ii) computing a third set of beamforming weights for the third subcarrier based on the first matrix decomposition and the channel estimates of the first user for the third subcarrier.

In some embodiments, computing, by the BS, beamforming weights for the first user, further includes: (2a) wherein the first matrix decomposition comprises a first null space; (2b) forming a first projection matrix, wherein forming the first projection matrix comprises projecting the channel estimates of the first user for the first subcarrier on the first null space; and (2c) determining a first singular value decomposition (SVD) of the first projection matrix, (3a) wherein computing the first set of beamforming weights for the first subcarrier is further based on the first SVD of the first projection matrix, (4a) forming a second projection matrix, wherein forming the second projection matrix comprises projecting the channel estimates of the first user for the second subcarrier on a second null space, wherein the second null space is obtained from updating the first matrix decomposition based on the channel estimates of the second set of users for the second subcarrier; and (4b) determining a second SVD of the second projection matrix, (5a) wherein computing the second set of beamforming weights for the second subcarrier is further based on the second SVD.

In embodiments, the matrix decomposition algorithm is based on a Kernel Stacked QR (KSQR) algorithm. In embodiments, updating the first matrix decomposition comprises utilizing an algorithm based on a Kernel Stacked QR (KSQR) algorithm. In embodiments, the matrix decomposition algorithm is based on a URV algorithm. In embodiments, updating the first matrix decomposition comprise utilizing an algorithm based on a URV algorithm.

In embodiments, obtaining, by the BS, channel estimates for the plurality of subcarriers includes using sounding reference signals (SRS), and the channel estimates are based on channel reciprocity. In embodiments, the method further includes computing, by the BS, beamforming weights for a second user, and computing, by the BS, the beamforming weights for the second user is performed in parallel with computing, by the BS, the beamforming weights for the first user. In embodiments, computing, by the BS, the beamforming weights for the first user further includes (5b) computing a fourth set of beamforming weights for a fourth subcarrier of the plurality of subcarriers, and computing the second set of beamforming weights for the second subcarrier is performed in parallel with computing the fourth set of beamforming weights for the fourth subcarrier of the plurality of subcarriers.

According to a second aspect, a base station (BS) is provided. The BS is adapted to obtain channel estimates of the first set of users for a plurality of subcarriers, the plurality of subcarriers including a first subcarrier and a second subcarrier. The BS is further adapted to compute beamforming weights for the first user. Computing, by the BS, the beamforming weights for the first user includes: (1) determining a second set of users, the second set of users being a subset of the first set of users and not including the first user; (2) determining a first matrix decomposition of a first matrix, the first matrix being based on the channel estimates of the second set of users for the first subcarrier, and wherein determining the first matrix decomposition of the first matrix comprises using a matrix decomposition algorithm; (3) computing a first set of beamforming weights for the first subcarrier based on the first matrix decomposition and the channel estimates of the first user for the first subcarrier; (4) updating the first matrix decomposition based on the channel estimates of the second set of users for the second subcarrier; and (5) computing a second set of beamforming weights for the second subcarrier based on the first matrix decomposition and channel estimates of the first user for the second subcarrier. The BS is further adapted to transmit data to the first user. Transmitting the data comprises transmitting the data using at least one of the first set and the second set of beamforming weights for the first user.

In some embodiments, the BS is further adapted to carry out the method according to any one of the embodiments of the first aspect.

According to a third aspect, a base station (BS) is provided. The BS includes an obtaining module configured to obtain channel estimates of the first set of users for a plurality of subcarriers, the plurality of subcarriers including a first subcarrier and a second subcarrier. The BS further includes a computing module configured to compute beamforming weights for the first user. Computing, by the BS, the beamforming weights for the first user comprises: (1) determining a second set of users, the second set of users being a subset of the first set of users and not including the first user; (2) determining a first matrix decomposition of a first matrix, the first matrix being based on the channel estimates of the second set of users for the first subcarrier, and wherein determining the first matrix decomposition of the first matrix comprises using a matrix decomposition algorithm; (3) computing a first set of beamforming weights for the first subcarrier based on the first matrix decomposition and the channel estimates of the first user for the first subcarrier; (4) updating the first matrix decomposition based on the channel estimates of the second set of users for the second subcarrier; and (5) computing a second set of beamforming weights for the second subcarrier based on the first matrix decomposition and channel estimates of the first user for the second subcarrier. The BS further includes a transmitting module configured to transmit data to the first user. Transmitting the data comprises transmitting the data using at least one of the first set and the second set of beamforming weights for the first user.

According to a fourth aspect, a base station (BS) is provided. The BS includes a receiver; a transmitter; a data storage system; and a data processing apparatus comprising a processor. The data processing apparatus is coupled to the data storage system, the transmitter, and the receiver, and the data processing apparatus is configured to obtain channel estimates of the first set of users for a plurality of subcarriers, the plurality of subcarriers including a first subcarrier and a second subcarrier. The data processing apparatus is further configured to compute beamforming weights for the first user. Computing, by the BS, the beamforming weights for the first user includes: (1) determining a second set of users, the second set of users being a subset of the first set of users and not including the first user; (2) determining a first matrix decomposition of a first matrix, the first matrix being based on the channel estimates of the second set of users for the first subcarrier, and wherein determining the first matrix decomposition of the first matrix comprises using a matrix decomposition algorithm; (3) computing a first set of beamforming weights for the first subcarrier based on the first matrix decomposition and the channel estimates of the first user for the first subcarrier; (4) updating the first matrix decomposition based on the channel estimates of the second set of users for the second subcarrier; and (5) computing a second set of beamforming weights for the second subcarrier based on the first matrix decomposition and channel estimates of the first user for the second subcarrier. The data processing apparatus is further configured to transmit data to the first user. Transmitting the data comprises transmitting the data using at least one of the first set and the second set of beamforming weights for the first user.

According to a fifth aspect, a computer program is provided. The computer program includes instructions which, when executed on at least one processor, causes the at least one processor to carry out the method according to any one of the embodiments of the first aspect.

According to a sixth aspect, a carrier is provided. The carrier includes the computer program of the fifth aspect. The carrier is one of an electronic signal, optical signal, radio signal or computer readable storage medium.

BRIEF DESCRIPTION OF THE DRAWINGS

The accompanying drawings, which are incorporated herein and form part of the specification, illustrate various embodiments.

DETAILED DESCRIPTION

Embodiments provide an innovative solution for finding the beamforming vectors which are based on classical BD. Particularly, embodiments exploit the principle of coherence interval, which suggests that the amplitude and phase of the channel is relatively constant over a small interval on a given t-f resource and thus, there is no need to re-compute the beamforming weights again. Instead, the previously computed weights (on the small interval of the given t-f resource) can be updated. To do this less-computationally-intense update operation, embodiments further exploit a principle from perturbation theory; namely, that when there is a minor change in the entries of a matrix, the decomposition of the matrix and the rank does not change heavily. In embodiments, the need to re-compute the BF weights can therefore be avoided.

For TX BF, in order to avoid the processing computations at the receiver, embodiments perform the BF weight calculations in the BS (e.g., eNodeB (eNB), gNB). The calculation of BF weights depends on the channel information measured in between the users and the BS. In embodiments, users (e.g., UEs) should report feedback to the BS of this information, based on measurements from the downlink. Usually such downlink measurements will be considered when determining uplink channel information, based on an assumption that the uplink channel information is reciprocal to the downlink channel information. Embodiments disclosed herein utilize this assumption (a/k/a reciprocity) to obtain channel information in the uplink, in order to compute the BF weights.

Figure 1:
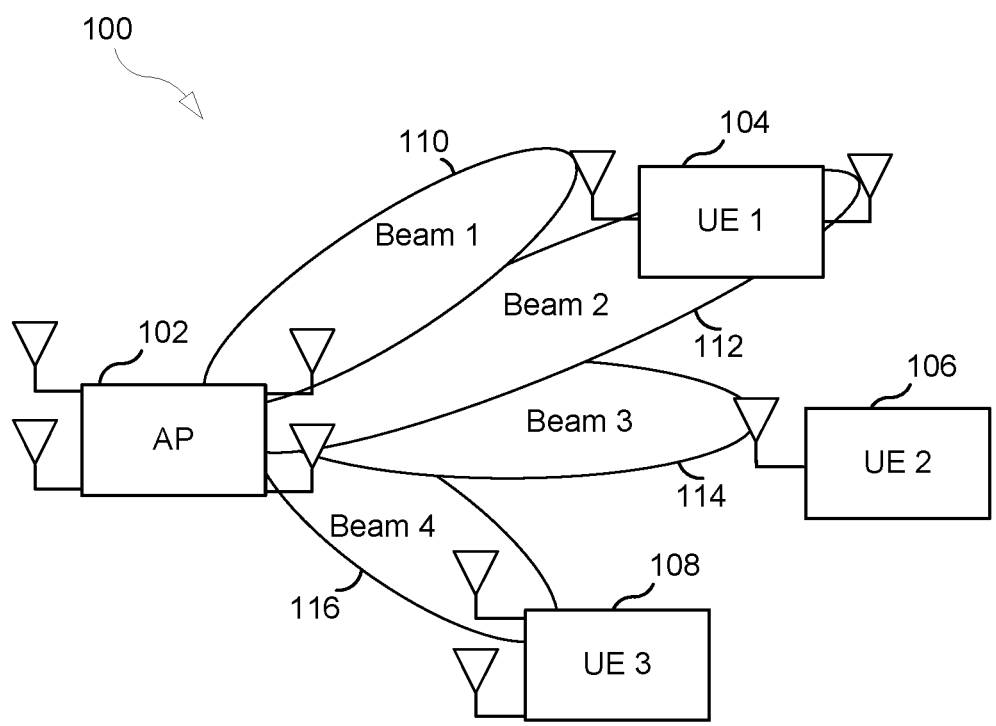
FIG. 1 illustrates a system according to some embodiments.
Figure 2:
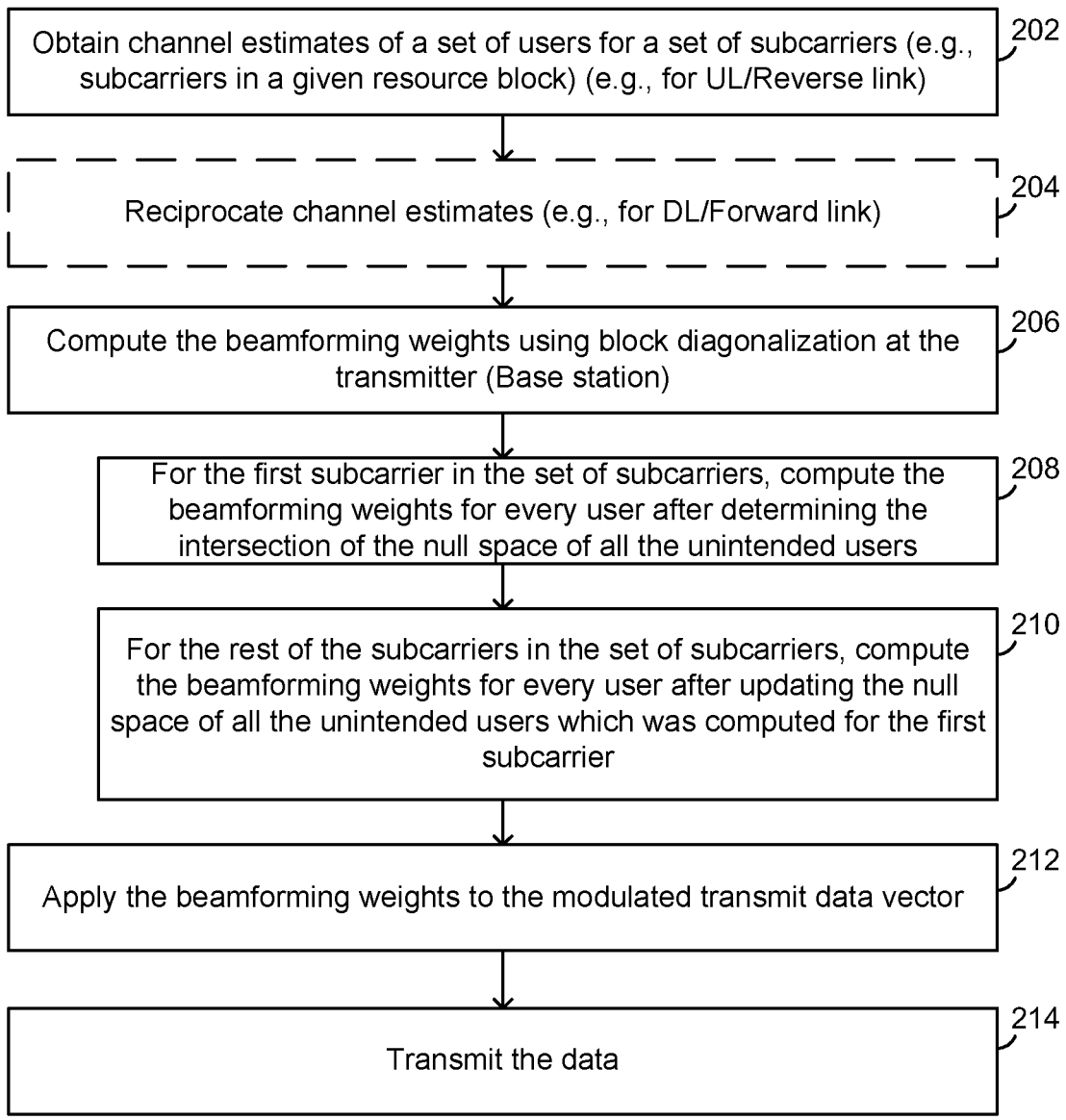
FIG. 2 illustrates a flow chart according to some embodiments.

Referring now to FIG. 2, a flow chart showing process 200 according to embodiments is shown. According to process 200, channel estimates of a set of users are obtained for a set of subcarriers (step 202). The set of users may be determined based on information (e.g., uplink channel information, or other information received from UEs, received from network nodes, or otherwise known to the BS) indicating active users which might cause interference for a given subcarrier. The set of subcarriers may include every subcarrier in a given resource block. The set of subcarriers may also span multiple resource blocks. In some embodiments, the set of subcarriers includes each adjacent subcarrier for which a given coherence criterion holds (e.g., a difference between channel estimates between a given subcarrier and the first subcarrier is less than a threshold). In some embodiments, the channel estimates are based on measurements performed on an uplink (a/k/a reverse link) direction, i.e. a link from the UE to the BS. In such embodiments, the principle of reciprocity is used to obtain channel estimates for the downlink (a/k/a forward link) direction (step 204). Next, BF weights are then computed using BD at the BS (step 206). Following computation of the BF weights, the BF weights are applied to a modulated transmit data vector (step 212), and then the data is transmitted (step 214).

The computation of BF weights in step 206 comprises steps 208 and 210. BF weights can be computed for each user in the set of users. For a given user (designated as the intended user), the set of unintended users refers to the set of users with the intended user removed. In process 200, BF weights for each user may be computed independently of each other, and therefore may be computed in parallel. For example, steps 206, 208, and 210 may be performed in parallel for each user. This may result in further improvements in performance.

For the first subcarrier in the set of subcarriers, BF weights are computed after determining the intersection of the null spaces of the channel estimates of the unintended users (step 208). This intersection may result, for example, from the decomposition of a channel estimate matrix that comprises channel estimates for the set of unintended users. The decomposition will result in a null space (referred to as the null space of all the unintended users), which is the intersection of the null spaces of the channel estimates for each of the unintended users. The BF weights may be based on this null space and may further be based on channel estimates of the intended user for the first subcarrier.

For the rest of the subcarriers in the set of subcarriers, BF weights are computed after updating the null space of all the unintended users which was computed for the first subcarrier (step 210). The updating may be based on channel estimates of the unintended users for the respective subcarrier. The BF weights may be based on the updated null space and may further be based on channel estimates of the intended user for the respective subcarrier.

Figure 3:
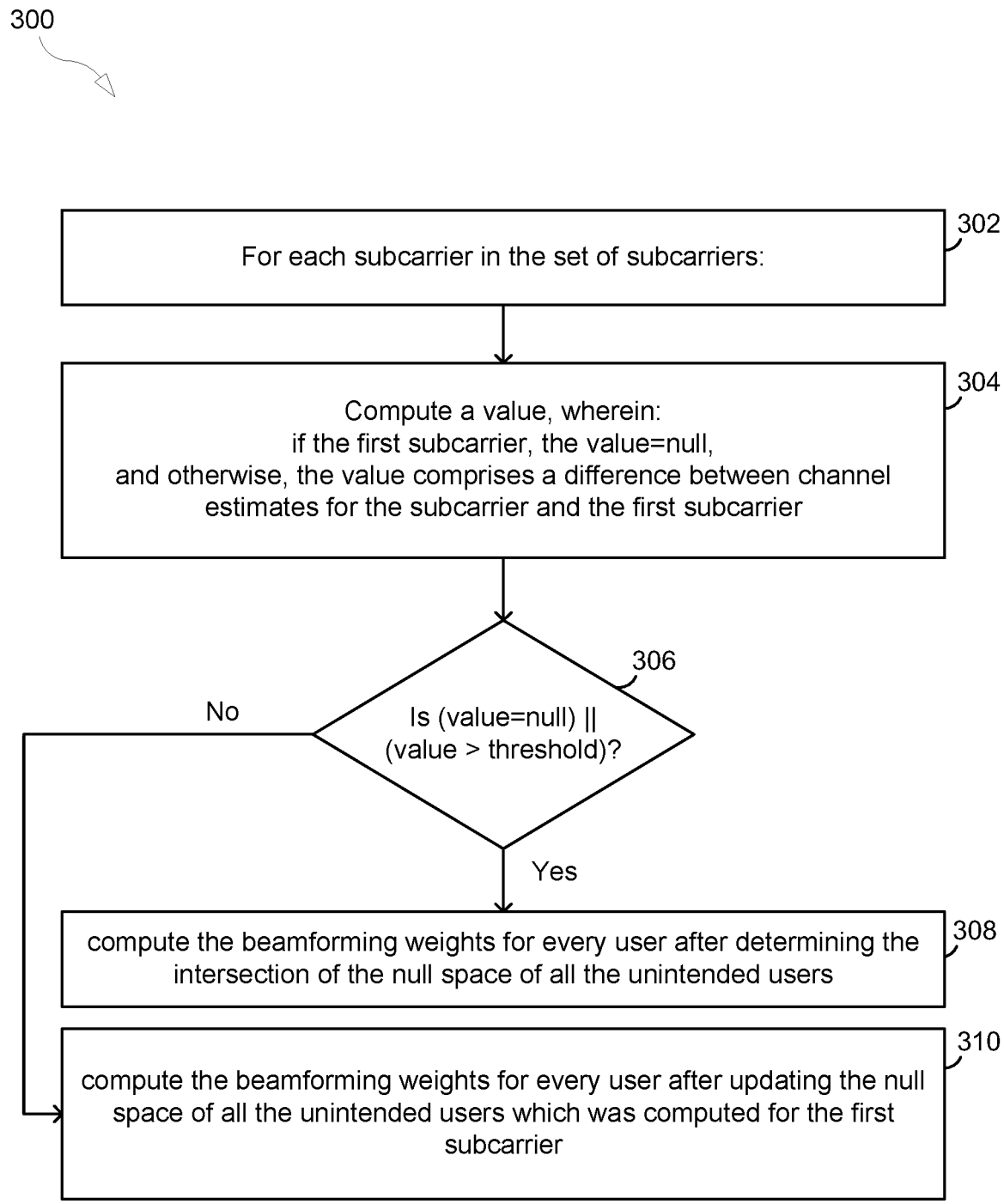
FIG. 3 illustrates a flow chart according to some embodiments.

Referring now to FIG. 3, a flow chart showing process 300 according to embodiments is shown. Process 300 is similar to process 200, except that steps 206-210 in process 200 (computing the BF weights for each subcarrier) are replaced by steps 302-310 in process 300. For each subcarrier in the set of subcarriers (loop step 302), a value (e.g., a metric value) is computed (step 304). If the subcarrier is the first subcarrier, then the value is "null" (indicating this is a special case). Otherwise (i.e., if the subcarrier is not the first subcarrier), the value is a difference between channel estimates of the set of users for the given subcarrier and the first subcarrier (e.g., computed as a Euclidean distance or other appropriate metric). If this difference exceeds a threshold (or if it is the special case where the value is "null"), then flow proceeds to step 308; otherwise flow proceeds to step 310 (decision step 306). In embodiments, the special case (e.g., for the first subcarrier) is handled separately from the loop iterating over the subcarriers, and the decision step 306 does not need to check for the special case.

In the first case (the difference exceeds a threshold or the value is null), then BF weights are computed after determining the intersection of the null spaces of the channel estimates of the unintended users (step 308). This is analogous to step 208 of process 200.

In the second case (the difference does not exceed the threshold and the value is not null), then BF weights are computed after updating the null space of all the unintended users which was computed for the first subcarrier (step 310). This is analogous to step 210 of process 200.

A difference between process 200 and process 300 is decision step 306, which enforces a coherence criterion. If the coherence criterion is not met (e.g., difference is greater than a threshold), then BF weights are computed after determining the null space (e.g., after a matrix decomposition algorithm). If the coherence criterion is met (e.g., difference is less than or equal to a threshold), then BF weights are computed after updating the null space (e.g., a matrix decomposition algorithm is not needed).

Some embodiments further make use of a linear-algebra technique called kernel stacked (KS) QR factorization (KSQR). This KSQR technique has advantages over the traditional SVD-based method to determine the null space of the unintended users. The primary cause of the higher complexity in classical BD solutions is the use the of SVD, as the SVD algorithm is computationally expensive. Therefore, the complexity of BD reduces, when employing embodiments disclosed herein, such as those based on KSQR, by at least an order of a magnitude. The complexity of embodiments further keeps reducing exponentially with the increase of transmit antennas and number of subcarriers until the condition of the coherence bandwidth is maintained. This reduction in complexity is achieved while embodiments maintain the same or similar or improved sum rate performance as in classical BD. Several charts (e.g., FIGS. 4-6B) illustrate this reduction in complexity, as well as the sum rate performance of embodiments.

Figure 4A:
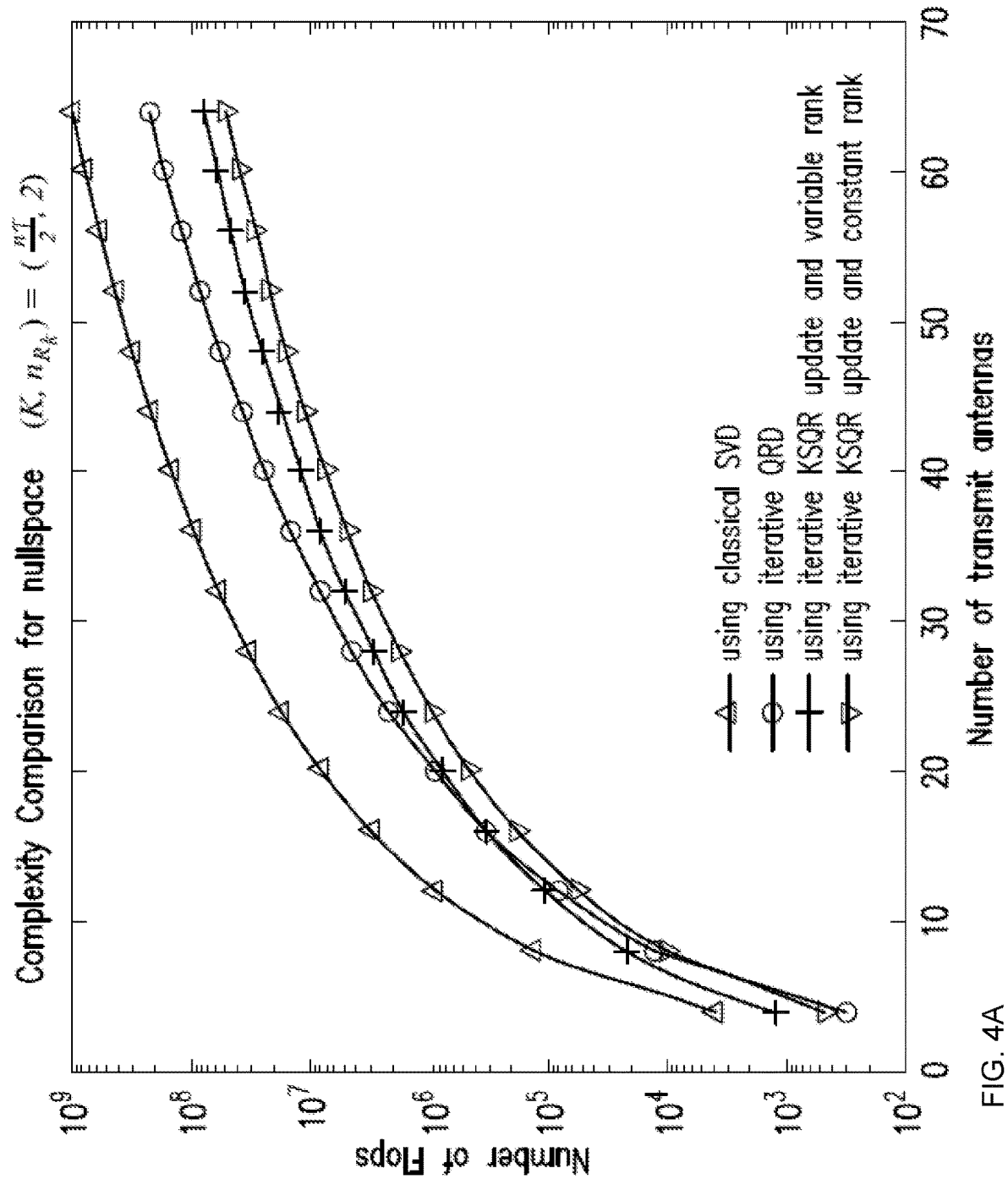
FIGS. 4A, 4B, and 4C illustrate a chart plotting complexity according to some embodiments.

Referring now to FIG. 4A, the figure illustrates the complexity to determine nullspace per subcarrier for different BD-based methods: (1) SVD-based method, (2) iterative QRD based method, (3) BD with iterative KSQR and variable rank, and (4) BD with iterative KSQR and constant rank. The figure represents the number of floating point operations (flops) plotted against the increase in the number of transmit antennas $n_T$. Here $n_{R_k}$ is number of receive antenna for the user and K is maximum number of users in the system. Clearly, as the number of transmit antennas increases (notably after 20), the complexity gain in between the proposed algorithms and the rest of the methods increases. Note that the variable rank condition is preferred, in some embodiments, to the constant rank update condition.

Figure 4B:
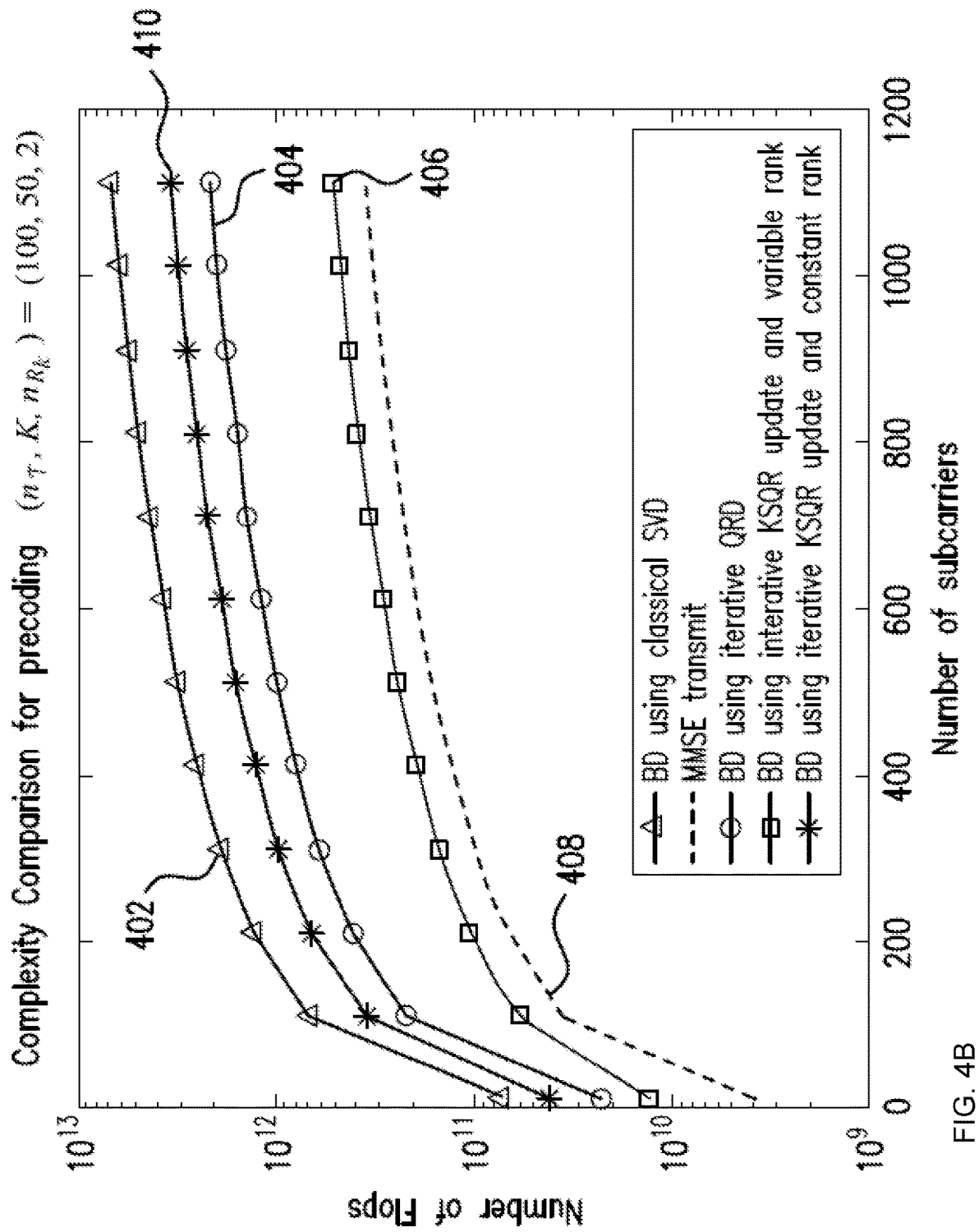

Referring now to FIG. 4B, a chart showing a complexity comparison of some embodiments compared to classical methods to compute TX BF weights in an OFDM system is shown. The weights are computed serially per user, from the user set for all the users. For the comparison, the number of transmit antennas $n_T$ was fixed to 100, the number of UEs (K) was fixed to 50, and the number of receive antennas $n_{R_k}$ was fixed to 2. Maximum number of layers (streams) is $(K \times n_{R_k})=100$. The number of subcarriers could vary, so that the complexity could be compared for different numbers of subcarriers. As shown, plotlines 402-410 for four different algorithms are plotted, with the number of subcarriers on the x-axis and a measure of complexity (here, number of "FLOPS" or floating-point operations per second) on the y-axis. An algorithm using BD with classical SVD is shown as plotline 402 (this is the highest in terms of complexity over all subcarriers). Next, an algorithm using BD with iterative QR decomposition (QRD) is shown as plotline 404. The last of the related art algorithms, MMSE based, is shown as plotline 408. The two algorithms shown representing embodiments are plotline 406 (BD with iterative KSQR and variable rank) and plotline 410 (BD with iterative KSQR and constant rank). MMSE transmit is a non-BD based algorithm. It is evident that transmit MMSE based precoding technique has lowest complexity for this type of serial implementation in an OFDM system. It can also be noted that the complexity of the algorithm mentioned in the embodiment varies depending on the type of the KSQR update method. Specifically, the KSQR with variable rank case, which is the preferred choice for OFDM based systems has substantially lower complexity than any of the known BD-based algorithms over all subcarriers. (Note: Results in this figure have also considered the complexity required for additional operations than determination of nullspace, such the projection of user matrix on the nullspace, range space determination using SVD, water-filling, and complexity required to compute the first QR factorization)

Figure 4C:
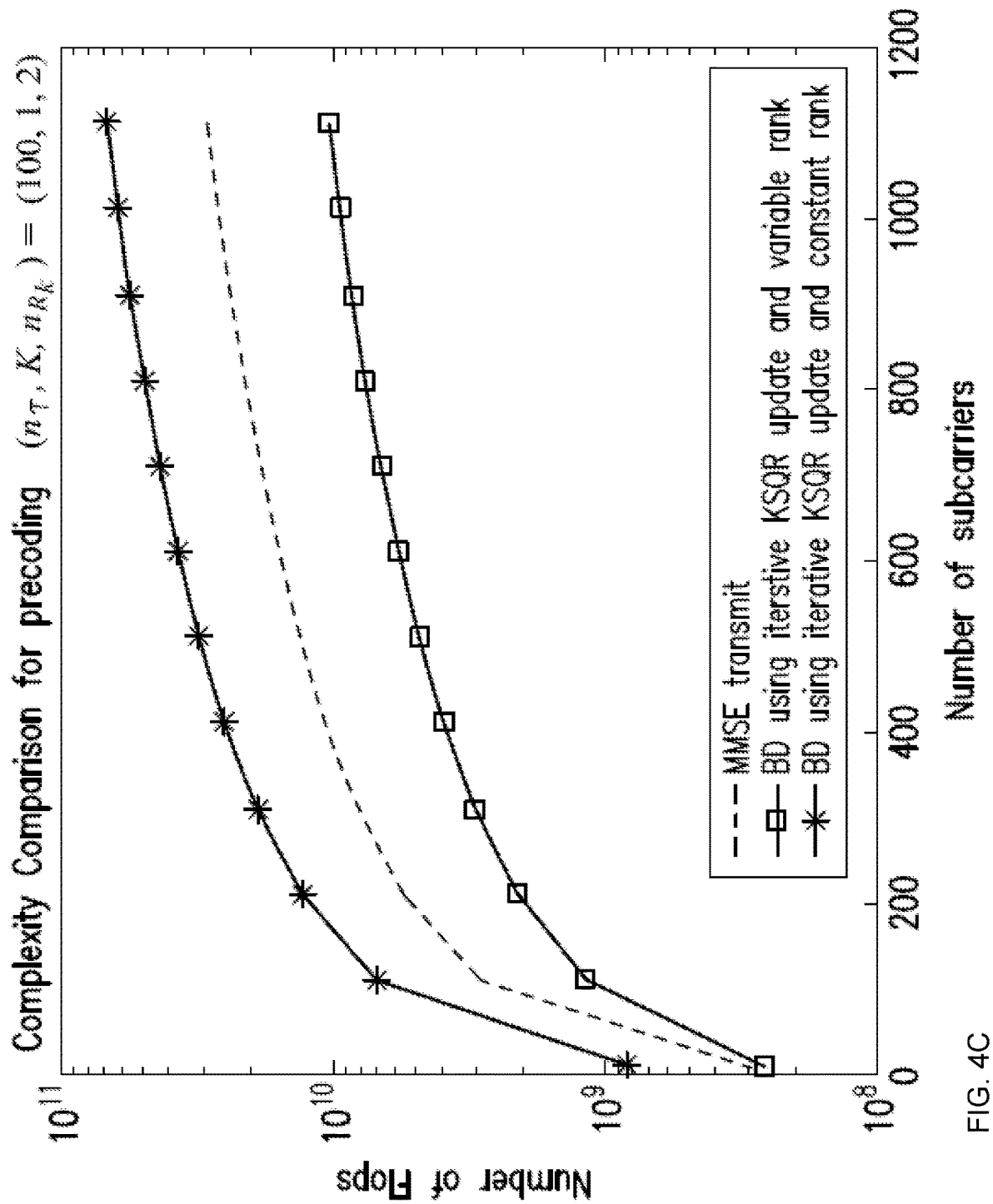

Referring now to FIG. 4C, a chart showing a complexity comparison of some embodiments compared to classical methods to compute TX BF weights in an OFDM system is shown. The weights are computed parallelly for all the users in the user set. For the comparison, the number of transmit antennas $n_T$ was fixed to 100, the number of UEs (K) was fixed to 1, and the number of receive antennas $n_{R_k}$ was fixed to 2. It can also be noted that the complexity of the algorithm mentioned in the embodiment varies depending on the type of the KSQR update method. Specifically, the KSQR with variable rank case, which is the preferred choice for OFDM based systems has lowest complexity compared to all the algorithms over all subcarriers presented in the chart.

Referring now to FIGS. 5A-6B, a comparison of sum rate capacity (e.g., bits/second/Hz) is shown, where SNR (FIG. 5A), the number of subcarriers (FIGS. 5A and 5B), transmit antennas (FIG. 6A), and the number of users (FIG. 6B) are allowed to vary. In each plot, the sum rate capacity of an embodiment (using a BD-based algorithm with iterative KSQR update) is compared to classical channel inversion.

Figure 5A:
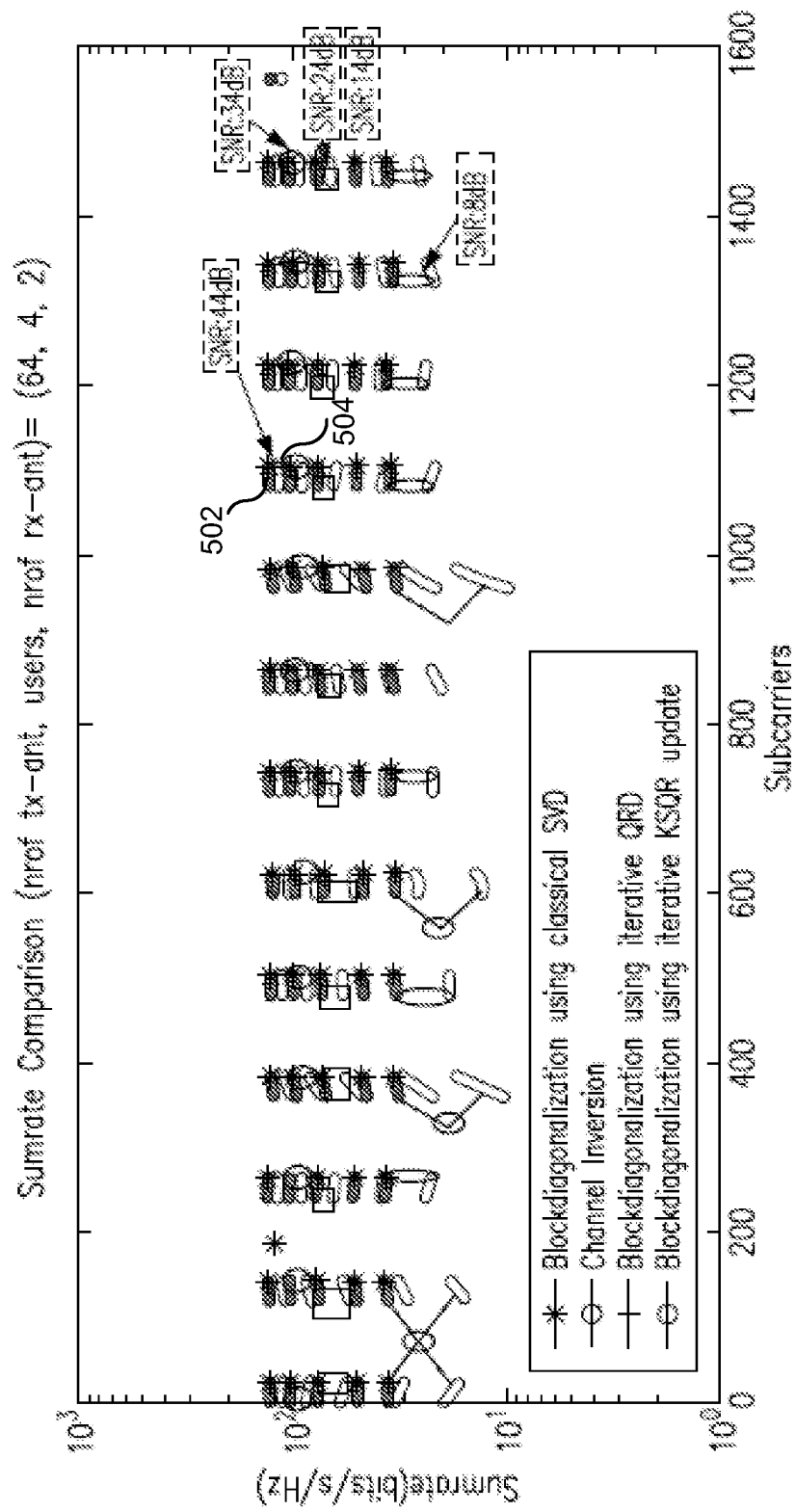
FIGS. 5A and 5B. illustrate charts plotting sum rate capacity according to some embodiments.

For example, as shown in FIG. 5A (where number of transmit antennas is fixed at 64, number of users is fixed at 4, and number of receive antennas is fixed at 2), the algorithm using a BD with iterative KSQR update shows improved sum rate capacity over channel inversion for a variety of SNR (e.g., SNR of 8 dB, 14 dB, 24 dB, 34 dB, 44 dB). For example, for a SNR of 44 dB, plot segment 502 (BD with iterative KSQR update) has improved sum rate capacity as compared to plot segment 504 (channel inversion).

Figure 5B:
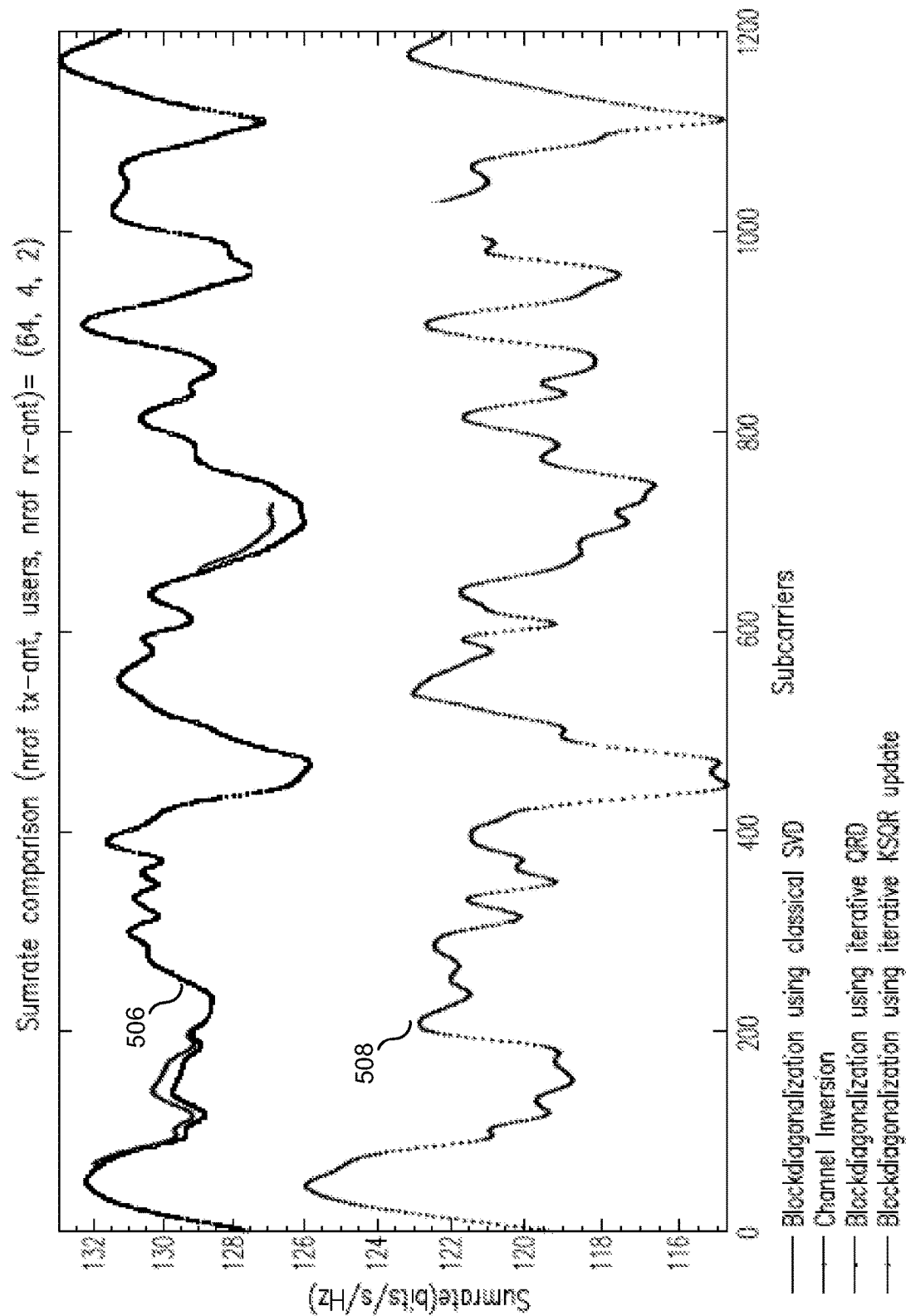

As shown in FIG. 5B (where number of transmit antennas is fixed at 64, number of users is fixed at 4, and number of receive antennas is fixed at 2), the plotline 506 (BD with iterative KSQR update) shows improved sum rate capacity over plotline 508 (channel inversion).

Figure 6A:
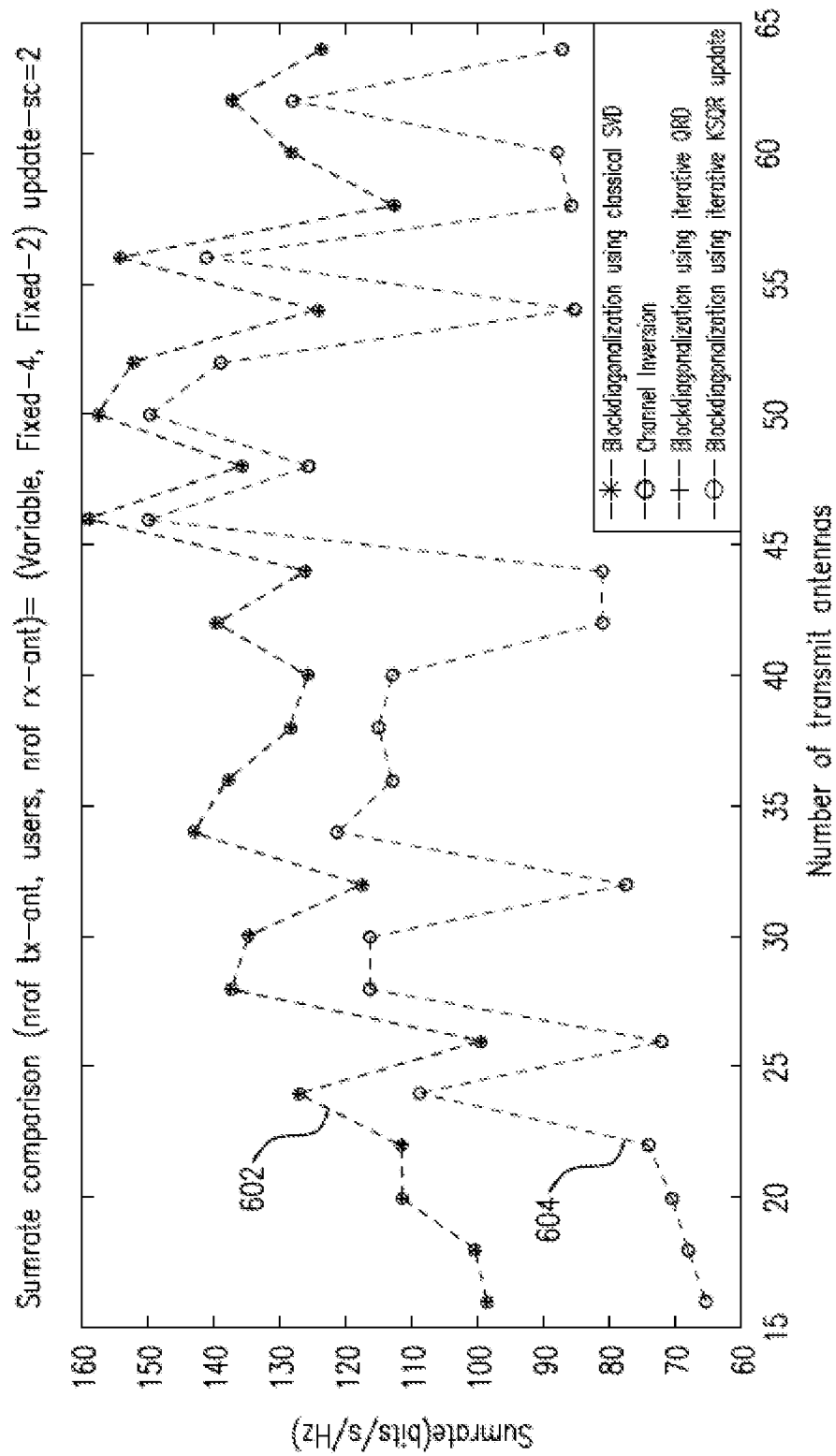
FIGS. 6A and 6B. illustrate charts plotting sum rate capacity according to some embodiments.

As shown in FIG. 6A (where number of transmit antennas is fixed at 64, number of users is fixed at 4 and number of receive antennas is fixed at 2), the plotline 602 (BD with iterative KSQR update) shows improved sum rate capacity over plotline 604 (channel inversion).

Figure 6B:
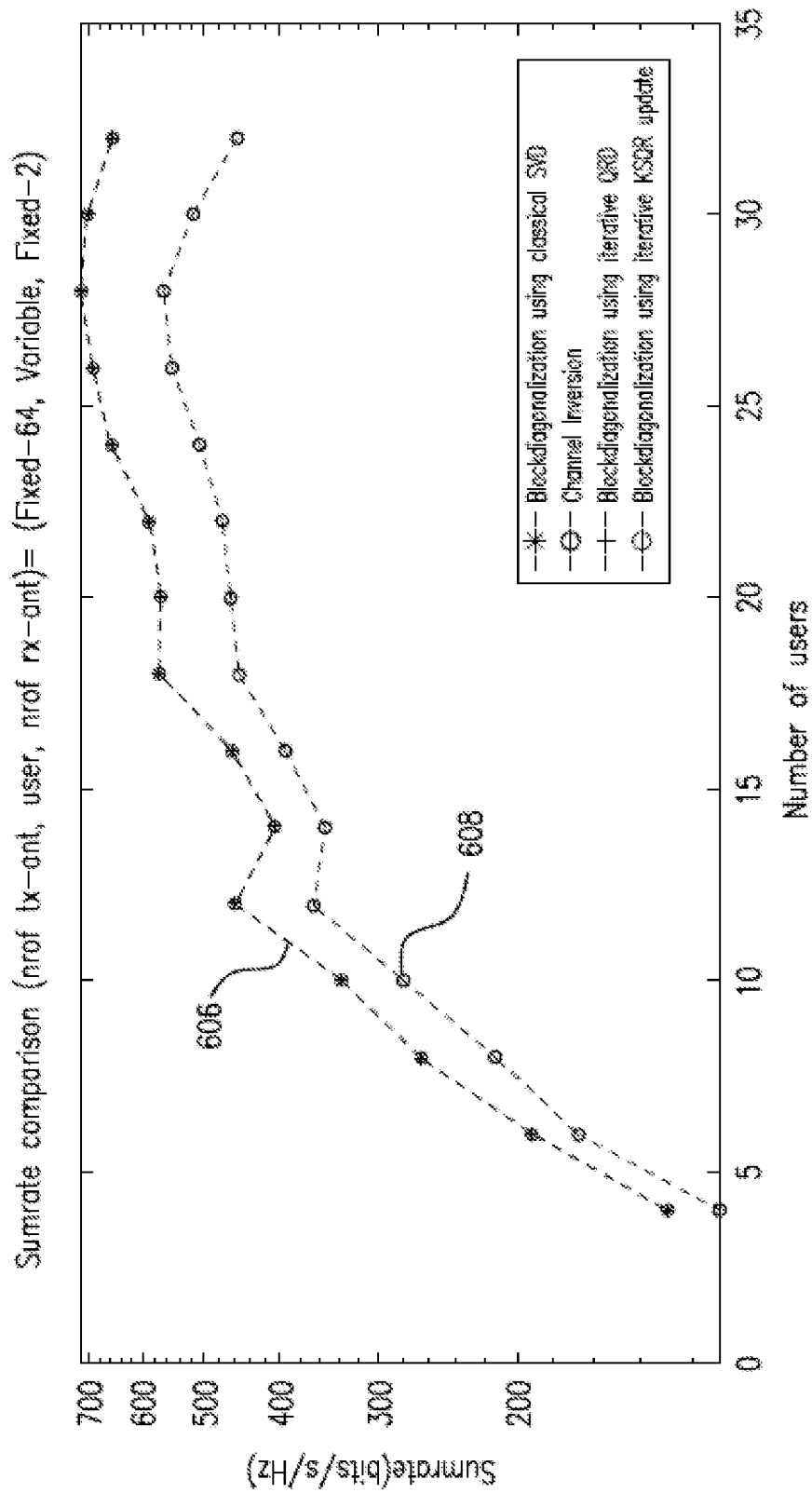

As shown in FIG. 6b (where number of transmit antennas is fixed at 64 and number of receive antennas is fixed at 2), the plotline 606 (BD with iterative KSQR update) shows improved sum rate capacity over plotline 608 (channel inversion).

Figure 7:
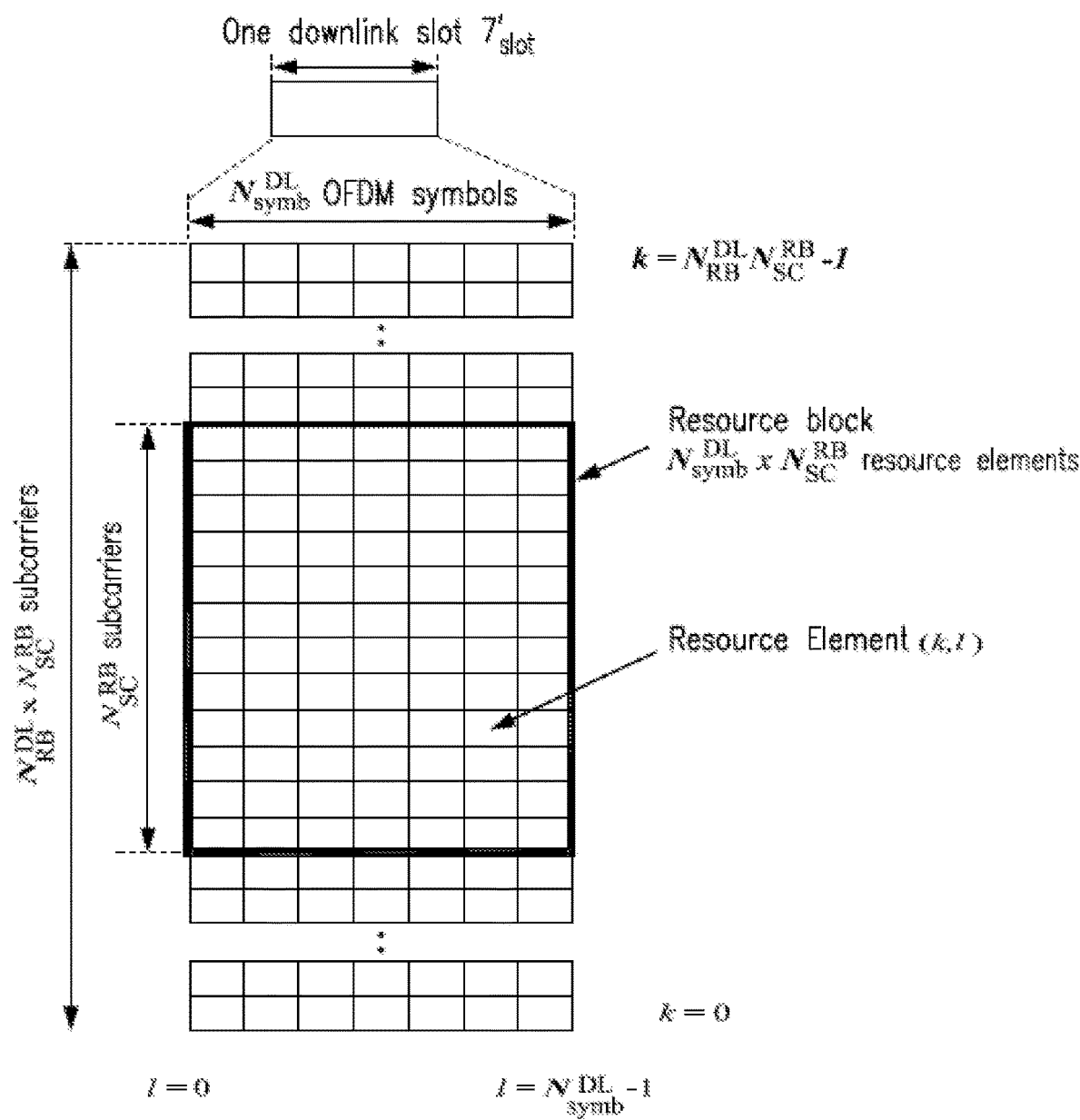
FIG. 7 illustrates a resource block according to some embodiments.

Referring now to FIG. 7, a time-frequency resource mapping in a communication system (e.g., LTE) is shown. The resource block (RB) is the basic scheduling t-f resource which is allocated to different users based on different physical channel and control signal functions. Channel estimates can be fetched from different Reference Symbols (RSes) in the uplink, as defined in the LTE standard. Considering a standard 20 Mhz bandwidth, having 15 Khz of subcarrier spacing on the frequency axis (vertical axis in the figure), a single RS has a transmission bandwidth configuration of 100 RBs, and every RB retains 12 subcarriers. In some embodiments, one or more subcarriers may contain uplink channel information indicating a set of active users which might cause inter-user interference for that subcarrier.

Assuming a low doppler channel model with a relatively flat or frequency non-selective fading, embodiments provide a low-complexity method to determine BF weights for users in a scheduled user set based on the uplink channel estimates (e.g., channel estimates obtained from using Sounding Reference Symbol (SRS)). If the channel is flat, then there is very minor change in the rank of the beamforming weights over the entire frequency spectrum or bandwidth (owing to a coherence region). As explained above, based on perturbation theory, when there is a minor change in the entries of a matrix, the decomposition of the matrix and the rank do not change heavily. Thus, instead of computing the decomposition again, the already-computed decomposition can just be updated, and a check for any update in the rank can also occur. This update operation is much less complex than a full decomposition. Thus, a lot of computations can be saved (e.g., by at least an order of a magnitude where the number of antennas is greater than 64). This makes embodiments particularly suitable for TX BF based on massive MIMO and massive IoT applications.

Figure 8:
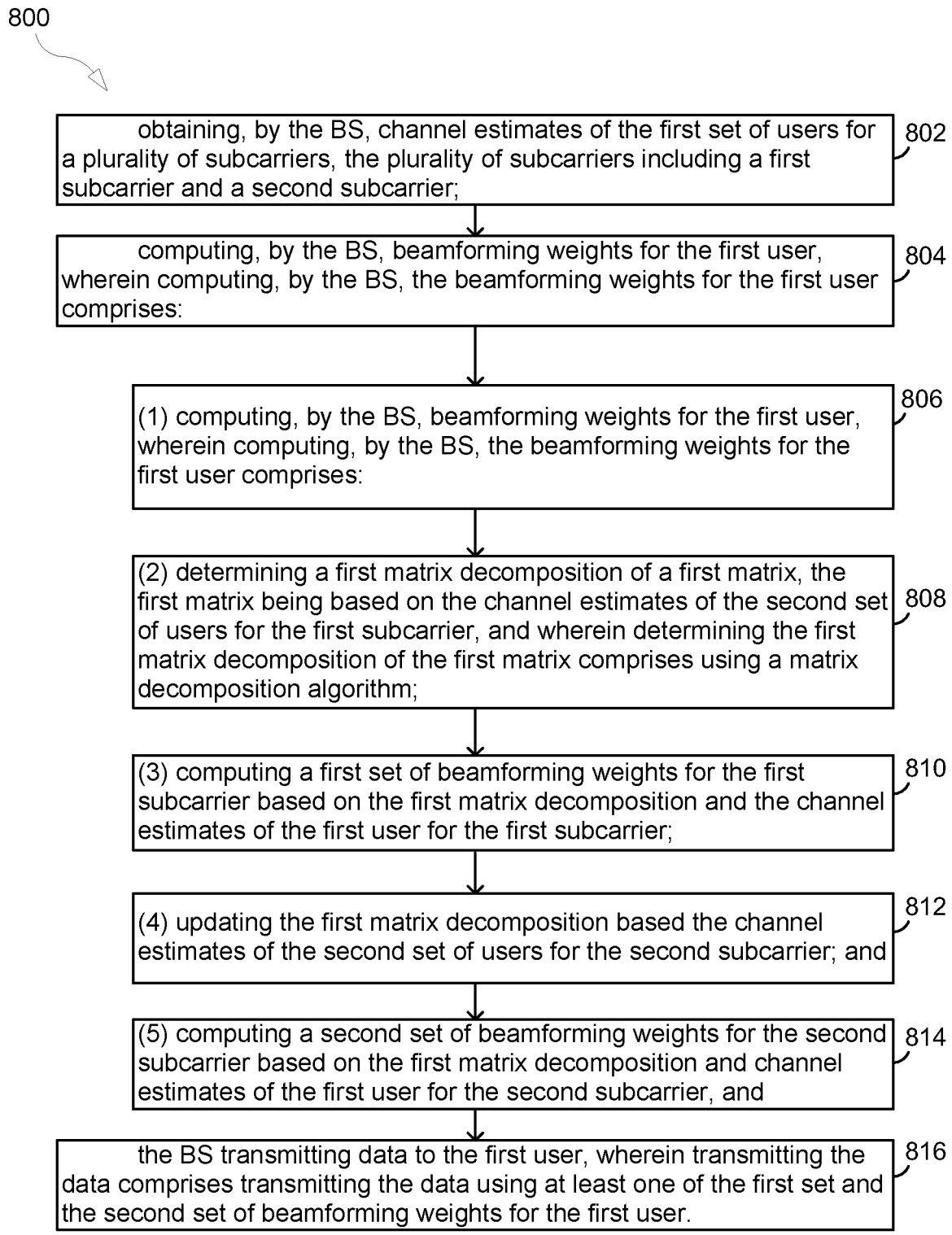
FIG. 8 illustrates a flow chart according to some embodiments.

Referring now to FIG. 8, process 800 is illustrated. Process 800 is a method for MU-MIMO TX BF performed by a BS serving a first set of users, the first set of users including a first user. The method includes obtaining, by the BS, channel estimates of the first set of users for a plurality of subcarriers, the plurality of subcarriers including a first subcarrier and a second subcarrier (step 802). The channel estimates, for example, may be based on measurements, such as measurements included in CSI reported as feedback from a UE. Such measurements may be based on SRS calculations. In some embodiments, channel reciprocity is assumed, so that downlink channel estimates may be obtained from uplink channel estimates. In some embodiments, obtaining, by the BS, channel estimates for the plurality of subcarriers comprises using sounding reference signals (SRS), and the channel estimates are based on channel reciprocity.

The method further includes computing, by the BS, beamforming weights for the first user (step 804). The method further includes the BS transmitting data to the first user (step 816).

Computing, by the BS, the beamforming weights for the first user comprises (1) determining a second set of users, the second set of users being a subset of the first set of users and not including the first user (step 806).

Computing, by the BS, the beamforming weights for the first user further comprises (2) determining a first matrix decomposition of a first matrix, the first matrix being based on the channel estimates of the second set of users for the first subcarrier (step 808). Determining the first matrix decomposition of the first matrix comprises using a matrix decomposition algorithm. For example, KSQR and URV are example matrix decomposition algorithms. In some embodiments, the first matrix decomposition comprises a first null space; and computing, by the BS, the beamforming weights for the first user further comprises (2b) forming a first projection matrix. Forming the first projection matrix comprises projecting the channel estimates of the first user for the first subcarrier on the first null space. In embodiments, computing, by the BS, the beamforming weights for the first user further comprises determining a first singular value decomposition (SVD) of the first projection matrix.

Computing, by the BS, the beamforming weights for the first user further comprises (3) computing a first set of beamforming weights for the first subcarrier based on the first matrix decomposition and the channel estimates of the first user for the first subcarrier (step 810). In some embodiments, computing the first set of beamforming weights for the first subcarrier is further based on the first SVD of the first projection matrix.

Computing, by the BS, the beamforming weights for the first user further comprises (4) updating the first matrix decomposition based on the channel estimates of the second set of users for the second subcarrier (step 812). In some embodiments, computing, by the BS, the beamforming weights for the first user further comprises (4a) forming a second projection matrix. Forming the second projection matrix comprises projecting the channel estimates of the first user for the second subcarrier on the first matrix decomposition. In some embodiments, computing, by the BS, the beamforming weights for the first user further comprises (4b) determining a second SVD of the second projection matrix.

Computing, by the BS, the beamforming weights for the first user further comprises (5) computing a second set of beamforming weights for the second subcarrier based on the first matrix decomposition and channel estimates of the first user for the second subcarrier (step 814). In some embodiments, (5a) computing the second set of beamforming weights for the second subcarrier is further based on the second SVD.

Transmitting the data comprises transmitting the data using at least one of the first set and the second set of beamforming weights for the first user.

In embodiments, the plurality of subcarriers further includes a third subcarrier, and computing, by the BS, the beamforming weights for the first user further comprises (6) determining whether a condition is true. Determining whether the condition is true comprises determining whether a difference (e.g., in the form of a Euclidean distance) between the channel estimates of the first set of users for the first subcarrier and the channel estimates of the first set of users for the third subcarrier exceeds a perturbation threshold.

In some embodiments, (7a) as a result of determining that the condition is true, computing, by the BS, the beamforming weights for the first user further comprises (7a-i) determining a second matrix decomposition of a second matrix, the second matrix being based on the channel estimates of the second set of users for the third subcarrier. Determining the second matrix decomposition of the second matrix comprises using the matrix decomposition algorithm. Computing, by the BS, the beamforming weights for the first user may further comprises (7a-ii) computing a third set of beamforming weights for the third subcarrier based on the second matrix decomposition and the channel estimates of the first user for the third subcarrier.

In some embodiments, (7b) as a result of determining that the condition is false, computing, by the BS, the beamforming weights for the first user further comprises (7b-i) updating the first matrix decomposition based on the channel estimates of the second set of users for the third subcarrier; and (7b-ii) computing a third set of beamforming weights for the third subcarrier based on the first matrix decomposition and the channel estimates of the first user for the third subcarrier.

In some embodiments, the matrix decomposition algorithm is based on a Kernel Stacked QR (KSQR) algorithm; in other embodiments, the matrix decomposition algorithm is based on a URV algorithm. In some embodiments updating the first matrix decomposition comprises utilizing an algorithm based on a Kernel Stacked QR (KSQR) algorithm; in other embodiments, updating the first matrix decomposition comprises utilizing an algorithm based on a URV algorithm.

In some embodiments, the plurality of subcarriers includes a number of subcarriers not less than 1000.

In some embodiments, beamforming weights for different users may be computed in parallel, independent of each other user. For example, in some embodiments, the method further includes computing, by the BS, beamforming weights for a second user, where computing, by the BS, the beamforming weights for the second user is performed in parallel with computing, by the BS, the beamforming weights for the first user.

In embodiments, process 800 initially computes the null space of the given channel estimates using a KSQR algorithm instead of SVD so that the KSQR update algorithm may be employed conveniently to update the null space for every later channel estimate matrix fed to the algorithm. Thus, in embodiments, the null space is computed only for the first subcarrier (e.g., the first subcarrier in a resource block), and for every later subcarrier, instead of re-computing the null space, the null space is updated. This process may be performed within a resource block (or group of resource blocks) where the amplitude and phase do not change much, e.g., for at least several subcarriers.

Figure 9:
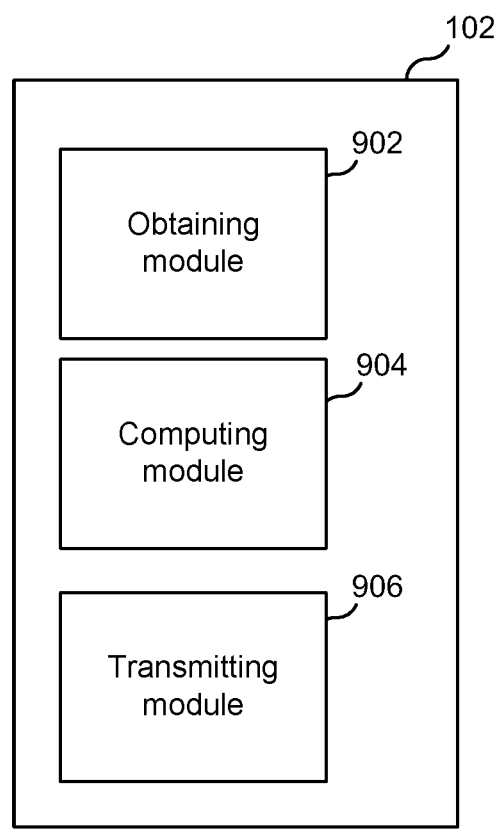
FIG. 9 is a diagram showing functional modules of a BS according to some embodiments.

FIG. 9 is a diagram showing functional modules of BS 102 according to some embodiments. As shown in FIG. 9, BS 102 includes an obtaining module 902, a computing module 904, and a transmitting module 906. BS 102 serves a first set of users, the first set of users including a first user. The obtaining module 902 is configured to obtain channel estimates of the first set of users for a plurality of subcarriers, the plurality of subcarriers including a first subcarrier and a second subcarrier. The computing module 904 is configured to compute beamforming weights for the first user. Computing, by the BS, the beamforming weights for the first user comprises: (1) determining a second set of users, the second set of users being a subset of the first set of users and not including the first user; (2) determining a first matrix decomposition of a first matrix, the first matrix being based on the channel estimates of the second set of users for the first subcarrier, and wherein determining the first matrix decomposition of the first matrix comprises using a matrix decomposition algorithm; (3) computing a first set of beamforming weights for the first subcarrier based on the first matrix decomposition and the channel estimates of the first user for the first subcarrier; (4) updating the first matrix decomposition based on the first matrix and the channel estimates of the second set of users for the second subcarrier; and (5) computing a second set of beamforming weights for the second subcarrier based on the first matrix decomposition and channel estimates of the first user for the second subcarrier. The transmitting module 906 is configured to transmit data to the first user. Transmitting the data comprises transmitting the data using at least one of the first set and the second set of beamforming weights for the first user.

Figure 10:
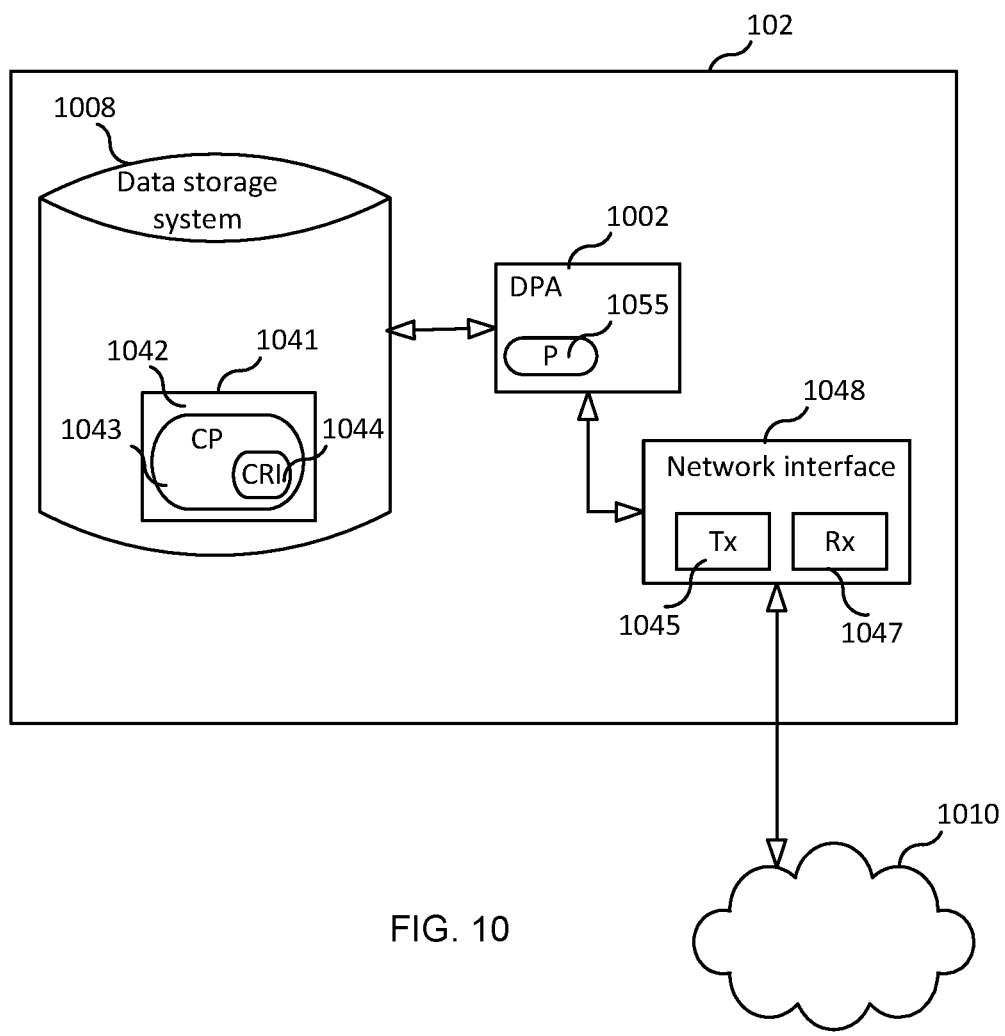
FIG. 10 is a block diagram of a BS according to some embodiments.

FIG. 10 is a block diagram of BS 102 according to some embodiments. As shown in FIG. 10, BS 102 may comprise: a data processing apparatus (DPA) 1002, which may include one or more processors (P) 1055 (e.g., a general purpose microprocessor and/or one or more other processors, such as an application specific integrated circuit (ASIC), field-programmable gate arrays (FPGAs), and the like); a network interface 1048 comprising a transmitter (Tx) 1045 and a receiver (Rx) 1047 for enabling BS 102 to transmit data to and receive data from other nodes connected to a network 1010 (e.g., an Internet Protocol (IP) network) to which network interface 1048 is connected; circuitry 1003 (e.g., radio transceiver circuitry) coupled to an antenna system 1004 for wireless communication with UEs); and local storage unit (a.k.a., "data storage system") 1008, which may include one or more non-volatile storage devices and/or one or more volatile storage devices (e.g., random access memory (RAM)). In embodiments where BS 102 includes a general purpose microprocessor, a computer program product (CPP) 1041 may be provided. CPP 1041 includes a computer readable medium (CRM) 1042 storing a computer program (CP) 1043 comprising computer readable instructions (CRI) 1044. CRM 1042 may be a non-transitory computer readable medium, such as, but not limited to, magnetic media (e.g., a hard disk), optical media, memory devices (e.g., random access memory), and the like. In some embodiments, the CRI 1044 of computer program 1043 is configured such that when executed by data processing apparatus 1002, the CRI causes BS 102 to perform steps described above (e.g., steps described above with reference to the flow charts). In other embodiments, BS 102 may be configured to perform steps described herein without the need for code. That is, for example, data processing apparatus 1002 may consist merely of one or more ASICs. Hence, the features of the embodiments described herein may be implemented in hardware and/or software.

| Abbreviation | Explanation |
| --- | --- |
| BS | Base Station |
| CSI | Channel State Information |
| FD-MIMO | Full Dimension MIMO |
| LTE | Long Term Evolution |
| MIMO | Multi-input, multi-output |
| MU-MIMO | Multi-user MIMO |
| PRB | Physical Resource Block |
| SRS | Sounding Reference Signal |

-continued

| Abbreviation | Explanation |
| --- | --- |
| TDD | Time Division Duplex |
| t-f | time-frequency |
| VL-MIMO | Very Large MIMO |
| BD | Block diagonalization |
| BF | Beamforming |
| KSQRD | Kernel Stacked QR Decomposition |
| SVD | Singular Value Decomposition |
| QRD | QR Decomposition |

While various embodiments of the present disclosure are described herein (including the appendices, if any), it should be understood that they have been presented by way of example only, and not limitation. Thus, the breadth and scope of the present disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method for Multi-User (MU) Multiple Input Multiple Output (MIMO) transmit beamforming performed by a base station (BS) serving a first set of users, the first set of users including a first user, and the method comprising:

obtaining, by the BS, channel estimates of the first set of users for a plurality of subcarriers, the plurality of subcarriers including a first subcarrier and a second subcarrier;

computing, by the BS, beamforming weights for the first user, wherein computing, by the BS, the beamforming weights for the first user comprises:

(1) determining a second set of users, the second set of users being a subset of the first set of users and not including the first user;

(2) determining a first matrix decomposition of a first matrix, the first matrix being based on the channel estimates of the second set of users for the first subcarrier, and wherein determining the first matrix decomposition of the first matrix comprises using a matrix decomposition algorithm;

(3) computing a first set of beamforming weights for the first subcarrier based on the first matrix decomposition and the channel estimates of the first user for the first subcarrier;

(4) updating the first matrix decomposition based on the channel estimates of the second set of users for the second subcarrier; and (5) computing a second set of beamforming weights for the second subcarrier based on the updated first matrix decomposition and channel estimates of the first user for the second subcarrier; and the BS transmitting data to the first user, wherein transmitting the data comprises transmitting the data using at least one of the first set and the second set of beamforming weights for the first user.

2. The method of claim 1, wherein the plurality of subcarriers further includes a third subcarrier, and wherein computing, by the BS, the beamforming weights for the first user further comprises:
  (6) determining whether a condition is true, wherein determining whether the condition is true comprises determining whether a difference between the channel estimates of the first set of users for the first subcarrier and the channel estimates of the first set of users for the third subcarrier exceeds a perturbation threshold; and
  (7a) as a result of determining that the condition is true:
    (7a-i) determining a second matrix decomposition of a second matrix, the second matrix being based on the channel estimates of the second set of users for the third subcarrier, and wherein determining the second matrix decomposition of the second matrix comprises using the matrix decomposition algorithm; and
    (7a-ii) computing a third set of beamforming weights for the third subcarrier based on the second matrix decomposition and the channel estimates of the first user for the third subcarrier.

3. The method of claim 1, wherein the plurality of subcarriers further includes a third subcarrier, and wherein computing, by the BS, the beamforming weights for the first user further comprises:
  (6) determining a condition, wherein the condition comprises whether a difference between the channel estimates of the first set of users for the first subcarrier and the channel estimates of the first set of users for the third subcarrier exceeds a perturbation threshold; and
  (7a) as a result of determining that the condition is false:
    (7a-i) updating the first matrix decomposition based on the channel estimates of the second set of users for the third subcarrier; and
    (7a-ii) computing a third set of beamforming weights for the third subcarrier based on the first matrix decomposition and the channel estimates of the first user for the third subcarrier.

4. The method of claim 1, wherein computing, by the BS, beamforming weights for the first user, further comprises:
  (2a) wherein the first matrix decomposition comprises a first null space;
  (2b) forming a first projection matrix, wherein forming the first projection matrix comprises projecting the channel estimates of the first user for the first subcarrier on the first null space; and
  (2c) determining a first singular value decomposition (SVD) of the first projection matrix,
  (3a) wherein computing the first set of beamforming weights for the first subcarrier is further based on the first SVD of the first projection matrix,
  (4a) forming a second projection matrix, wherein forming the second projection matrix comprises projecting the channel estimates of the first user for the second subcarrier on a second null space, wherein the second null space is obtained from updating the first matrix decomposition based on the channel estimates of the second set of users for the second subcarrier; and
  (4b) determining a second SVD of the second projection matrix,
  (5a) wherein computing the second set of beamforming weights for the second subcarrier is further based on the second SVD.

5. The method of claim 1, wherein the matrix decomposition algorithm is based on a Kernel Stacked QR (KSQR) algorithm.

6. The method of claim 1, wherein updating the first matrix decomposition comprises utilizing an algorithm based on a Kernel Stacked QR (KSQR) algorithm.

7. The method of claim 1, wherein the matrix decomposition algorithm is based on a URV algorithm.

8. The method of claim 1, wherein updating the first matrix decomposition comprise utilizing an algorithm based on a URV algorithm.

9. The method of claim 1, wherein obtaining, by the BS, channel estimates for the plurality of subcarriers comprises using sounding reference signals (SRS), and wherein the channel estimates are based on channel reciprocity.

10. The method of claim 1, further comprising:
  computing, by the BS, beamforming weights for a second user,
  wherein computing, by the BS, the beamforming weights for the second user is performed in parallel with computing, by the BS, the beamforming weights for the first user.

11. The method of claim 1, wherein computing, by the BS, the beamforming weights for the first user further comprises:
  computing a third set of beamforming weights for a third subcarrier of the plurality of subcarriers,
  wherein computing the second set of beamforming weights for the second subcarrier is performed in parallel with computing the third set of beamforming weights for the third subcarrier of the plurality of subcarriers.

12. A base station (BS), the BS comprising:
  a receiver;
  a transmitter;
  a data storage system; and
  a data processing apparatus comprising a processor, wherein the data processing apparatus is coupled to the data storage system, the transmitter, and the receiver, and the data processing apparatus is configured to:
    obtain channel estimates of a first set of users for a plurality of subcarriers, the plurality of subcarriers including a first subcarrier and a second subcarrier, wherein the first set of users includes a first user;
    compute beamforming weights for the first user by performing a process that includes:
      (1) determining a second set of users, the second set of users being a subset of the first set of users and not including the first user;
      (2) determining a first matrix decomposition of a first matrix, the first matrix being based on the channel estimates of the second set of users for the first subcarrier, and wherein determining the first matrix decomposition of the first matrix comprises using a matrix decomposition algorithm;
      (3) computing a first set of beamforming weights for the first subcarrier based on the first matrix decomposition and the channel estimates of the first user for the first subcarrier;
      (4) updating the first matrix decomposition based on the channel estimates of the second set of users for the second subcarrier; and
      (5) computing a second set of beamforming weights for the second subcarrier based on the updated first matrix decomposition and channel estimates of the first user for the second subcarrier; and
    transmit data to the first user using at least one of the first set and the second set of beamforming weights for the first user.

13. A computer program product comprising a non-transitory computer readable medium storing a computer program comprising instructions which, when executed on at least one processor, causes the at least one processor to:
obtain channel estimates for a plurality of subcarriers, the plurality of subcarriers including a first subcarrier and a second subcarrier;
compute beamforming weights for a first user by performing a process that includes:
(1) determining a second set of users, the second set of users being a subset of a first set of users and not including the first user;
(2) determining a first matrix decomposition of a first matrix, the first matrix being based on the channel estimates of the second set of users for the first subcarrier, and wherein determining the first matrix decomposition of the first matrix comprises using a matrix decomposition algorithm;
(3) computing a first set of beamforming weights for the first subcarrier based on the first matrix decomposition and the channel estimates of the first user for the first subcarrier;
(4) updating the first matrix decomposition based on the channel estimates of the second set of users for the second subcarrier; and
(5) computing a second set of beamforming weights for the second subcarrier based on the updated first matrix decomposition and channel estimates of the first user for the second subcarrier; and
employ a transmitter to transmit data to the first user using at least one of the first set and the second set of beamforming weights for the first user.

* * * * *